No. 795,819. PATENTED AUG. 1, 1905.
H. K. COWEN.
VARIABLE SPEED TRANSMISSION MECHANISM.
APPLICATION FILED NOV. 25, 1904.
2 SHEETS—SHEET 1.
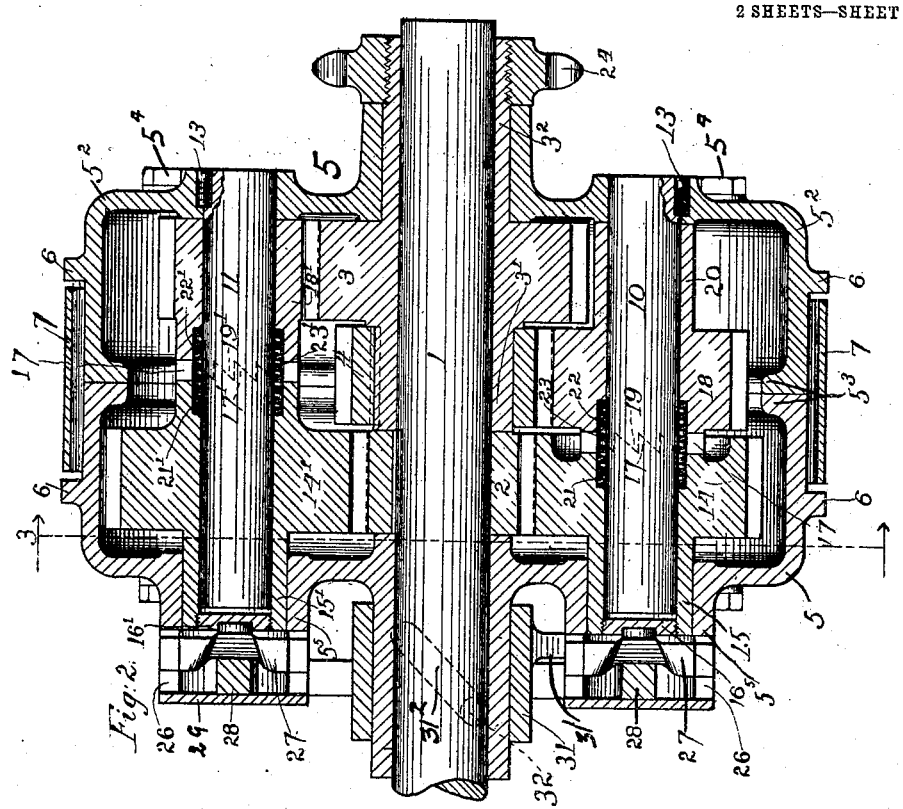
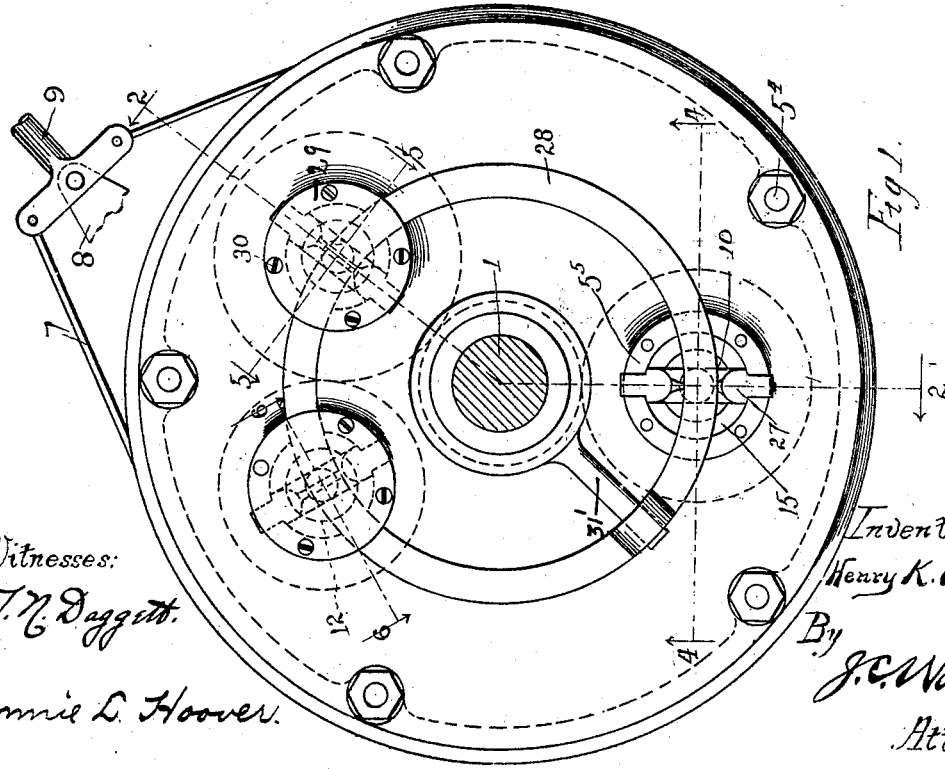
Witnesses:
T. N. Daggett.
Annie L. Hoover.
Inventor:
Henry K. Cowen
By J. C. Warnes,
Atty.

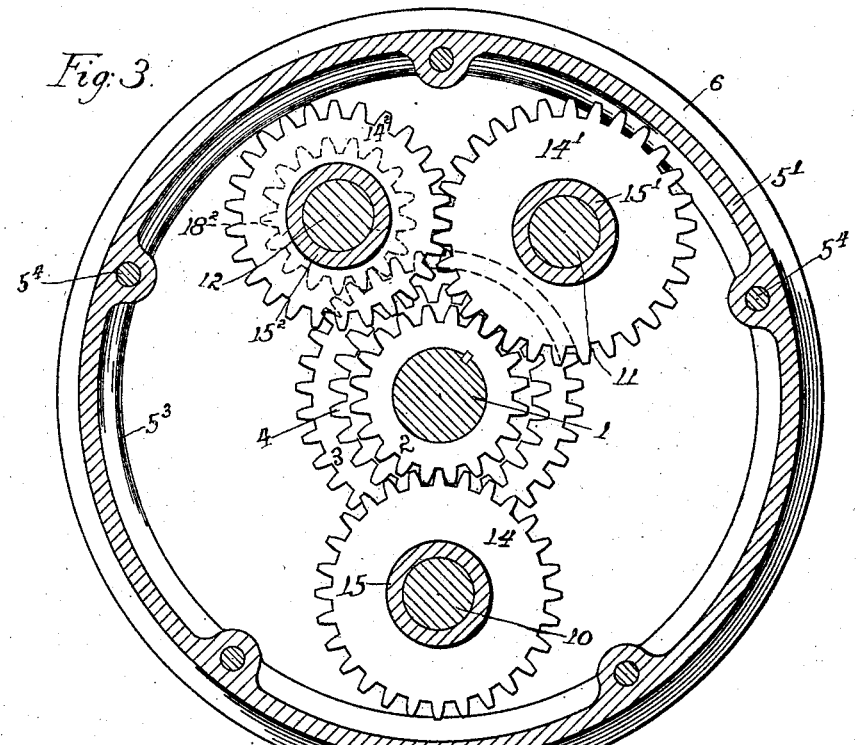
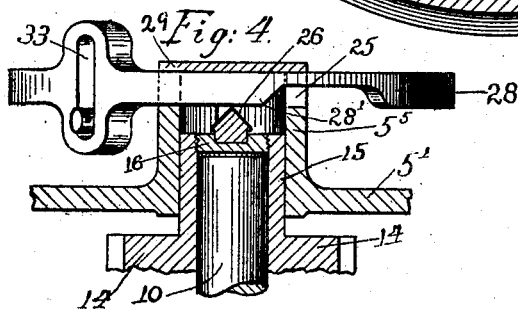
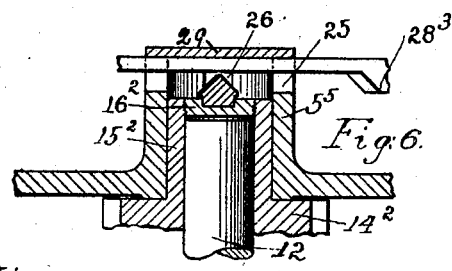

UNITED STATES PATENT OFFICE.

HENRY K. COWEN, OF CHICAGO, ILLINOIS.

VARIABLE-SPEED TRANSMISSION MECHANISM.

No. 795,819.  Specification of Letters Patent.  Patented Aug. 1, 1905.

Application filed November 25, 1904. Serial No. 234,113.

*To all whom it may concern:*

Be it known that I, HENRY K. COWEN, a citizen of the United States, residing at Chicago, in the county of Cook and State of Illinois, have invented a new and useful Improvement in Variable-Speed Transmission Mechanism, of which the following is a complete specification.

This invention relates, broadly, to devices employed for changing the speed in power transmission, but is designed more particularly to be used in connection with the power transmission of self-propelled vehicles.

The object of the invention is to provide suitable speed-changing mechanism which shall not involve the use of internal gearing, as such gearing is difficult and expensive to produce accurately. The planetary gears used are exclusively spur-gears, and by the novel arrangement whereby the component parts are reduced in number the weight of the mechanism as a whole will in consequence be lessened from what is ordinarily required, thus reducing the tendency to break arising from the inertia of the moving parts.

Another object of the invention consists in the arrangement of parts whereby it is necessary to restrain the movement of only one moving element in order to secure three speeds in one direction and a reverse speed.

Further subordinate objects of this invention will appear in the disclosure thereof, as set forth in the accompanying drawings, in which—

Figure 1 represents a side elevation of the complete mechanism. Fig. 2 is a longitudinal section of same, taken on the broken line 2 2 of Fig. 1. Fig. 3 is a transverse section of the device, taken as indicated by the line 3 3 of Fig. 2. Fig. 4 is a fragmentary longitudinal section taken as indicated by the line 4 4 of Fig. 1 and designed to illustrate the construction of the cam and coöperating parts which actuate the clutching device on the gear connection of the intermediate speed. Fig. 5 is a similar section illustrating the construction of the corresponding parts on the slow speed, while Fig. 6 is a corresponding view of the clutch-actuating device on the reverse-gear connection, and Fig. 7 is a perspective of the cam-engaging sliding head.

Referring to the drawings, 1 designates the driving-shaft, which for convenience may be regarded as the projecting end of the crank-shaft of the engine from which power is derived.

2 is a spur-gear fixed rigidly to said driving-shaft and will hereinafter be termed the "driving-gear." On the driving-shaft 1 is loosely sleeved a plurality of gears, preferably two in number, a large and small one, (designated by the numerals 3 and 4, respectively, and which will hereinafter be termed the "loosely-sleeved" gears on the driving-shaft.) A frame 5 also sleeves loosely upon the said driving-shaft 1. This frame affords journal-bearings for the planetary gears and is preferably so constructed as to constitute a closed casing in which all the gears journal. The frame 5 is made in two parts $5'$ and $5^2$, symmetrically arranged, strengthened by the medial ribs $5^3$ and held together by means of the bolts $5^4$. On the periphery of this casing are formed the two ribs 6 6, the intervening surface therebetween being finished to receive the brake-band 7, which is secured to a fixed support 8 and operated by any suitable means, such as the lever 9, only a portion of which is shown, as it is not material to this invention.

In the frame or casing 5 are secured fixed shafts 10, 11, and 12, on which are journaled the medium-speed, the low-speed, and the reversing gear connections, respectively, the said shafts being fixed in the frame by means of the set-screws 13. On the shaft 10 of the medium-speed-gear connections is loosely sleeved the spur-gear 14, which meshes with and is driven by the driving-gear 2 on the driving-shaft 1. This spur-gear 14 is provided with the long hub 15, as clearly shown in Fig. 2, which hub journals in a suitable bearing in the portion $5'$ of the frame 5. One end of the shaft 10 is supported in this hub 15, and thus only indirectly supported in the frame at this end. In the end of the hub 15 is secured the plug 16, which is provided with a central circular depression, as indicated in the several figures, this depression being adapted to engage the adjacent members of the clutching device, as will be hereinafter more fully explained. The inner face of the gear 14 is recessed, as shown, and provided with the clutch-teeth 17, arranged to engage corresponding clutch-teeth 19 on the gear 18, which sleeves loosely also on said shaft 10 and meshes with and drives the smaller of the loosely-sleeved gears on the driving-shaft 1. The gear 18 is provided with the long sleeve 20 on the side opposite from the clutch-teeth 19, the sleeve operating to extend the bearing-surface of said gear. Within the bore of the gears 14 and 18 on their adjacent ends are formed the recesses 21 and 22, respectively, in which is placed the expansion-spring 23, this spring exerting a force which tends to press the gear 14 longitudinally toward the side 5' of the frame and the clutch-teeth thereon out of engagement with the coacting clutch-teeth on the gear 18. It will be observed that a space is provided between the outer face of the gear 14 and the side 5' of the frame or casing, this space permitting of the slight longitudinal movement of the gear required for disengaging it from the one adjacent thereto. The gears 4, 14, and 18 are preferably made of such a size with respect to the driving-gear 2 that the speed of the gear 4 will be about two-thirds of that of said driving-gear, or the velocity ratio transmitted by this gear connection will be represented by the fraction $\frac{2}{3}$.

The loosely-sleeved gears 4 and 3 are preferably made fixed in relation to each other, the larger of said gears 3 being provided with the sleeve 3', on which is fixed the gear 4, while on the outer side of said gear is formed the long sleeve $3^2$, to the outer end of which is secured the sprocket-wheel 24, from which the power is delivered from said mechanism.

On the shaft 11 are loosely sleeved the gears 14' and 18', which constitute the low-speed-gear connection, the relative sizes thereof being such that the speed transmitted to the large gear 3 through this connection is preferably about one-third of that of the driving-gear 2, so that the velocity ratio of this low-speed-gear connection would be represented by the fraction $\frac{1}{3}$.

The general arrangement and construction of the several gear connections are substantially the same, the hub 15' journaling in the frame 5' and provided with the plug 16', the clutch-teeth 17' and 19' on the inner faces of the hubs of the gears, the recesses 21' and 22' in the gears 14' and 18', respectively, and the spring 23' therein with the space between the outer face of the gear 14' and the part 5' of the frame all arranged and performing the same office as in the medium-speed-gear connections first described. As the several gear connections can be engaged and operated by the clutching mechanism independent of each other, they may be regarded as independent gear connections.

In order to effect a reverse motion of the sprocket-wheel 24, a gear connection is interposed between the driving-gear 14' of the low-speed-gear connection and the larger gear 3 of the loosely-sleeved gears, as indicated in Figs. 1 and 3, these gears being loosely mounted upon the shaft 12 and arranged as are the other gear connections, except, as before stated, the gear $14^2$ (see Fig. 3) meshes with and is driven by the gear 14' instead of by the driving-gear 2. The other gear $18^2$ on the shaft 12 is shown in dotted lines in Fig. 3 and is preferably of equal size with the gear 18', while the gear $14^2$ is arranged to operate as closely as possible to the driving-gear 2. As the reversing-gear connection is with the above-noted exceptions identical in construction with the gear connections already described, detailed drawings thereof further than that given is deemed unnecessary. Figs. 4, 5, and 6 are fragmentary longitudinal sections through the clutch-actuated end or the left-hand end of the several connections as viewed in Fig. 2, in which it will be noted that the only distinguishing feature in the several views is the cam-ring which actuates the gears 14, 14', and $14^2$.

The preferred form of clutching device is constructed as follows: The bosses $5^5$ on the portion 5' of the frame extend beyond the ends of the gear-hubs 15, 15', and $15^2$ and in the extended ends are formed the peripherally-cut slots 25 and the radial slots 26, both of said slots being symmetrically disposed with respect to the said bosses $5^5$. In the radially-disposed slots 26 are placed the sliding heads 27, the under sides of which are provided with cylindrical lugs 27', which engage the corresponding recesses or depressions in the lugs 16, 16', and $16^2$ of the several gear connections. The ends $27^2$ of this sliding head are tenoned, as shown, to fit in said radial slots, and the central portion of said head forms a wedge $27^3$, which acts as a cam-surface against which the cam-ring 28 impinges. The cam-ring 28 is placed within the peripheral slots and above or outside the said sliding heads, the said ring being held in place by means of the cap-plates 29, which are secured to the ends of the bosses $5^5$ by the set-screws 30. The under or engaging portion of this cam-ring is provided with cam projections 28', $28^2$, and $28^3$, as shown, which press against the said wedges $27^3$ of the sliding heads 27. The cam projection 28' actuates the clutch on the gears 14 and 18, the cam projection $28^2$ the clutch on the gears 14' and 18', while the cam projection $28^3$ actuates the clutch on the gears $14^2$ and $18^2$. Two cam projections $28^2$, as shown in Fig. 5, are provided to operate the clutch on gear 14', the object being to enable the clutching mechanism on the shaft 10 and 11 to be engaged both successively and simultaneously.

To impart rotative movement to the ring 28, a collar 31, provided with an arm 31', sleeves upon the hub of the frame 5. A spiral slot $31^2$ in said collar engages a pin 32, so that longitudinal movement of the collar will effect rotative movement thereof, while a slot 33 in the ring 28 engages said arm 31', the slot permitting of the endwise movement of the collar.

The operation of the device is as follows: The low-speed connection is effected when the gear 14' is thrown into engagement with the gear 18', which is accomplished by means of the sliding head 27 being pressed inwardly by the first or right-hand cusp or projection $28^2$, as shown in Fig. 5. When these gears 14' and 18' are so engaged, the sliding head 27, operating the gear 14, (see Fig. 4,) will be pressed outwardly by the spring 23 and made to occupy a position within the cut-away portion of the cam-ring 28, in which position the gears 14 and 18 will be disengaged. Further movement of the cam-ring 28 to the right, as viewed in Figs. 4 to 6, will permit the sliding head on the low-speed connection to occupy a position between the two cusps $28^2$ and disengage the gear 14' from the gear 18', while continued movement of said ring will engage the medium-speed connection on the shaft 10, in which position the adjacent sliding head 27 will rest upon the projection 28'. Further continued movement of said ring 28 will hold the medium-speed-gear connection clutched or in engagement and again throw in engagement the low-speed connection, bringing the parts to the position shown in Fig. 2. It is evident that when in this position the parts will be locked against rotation and the mechanism as a whole will be made to move at the same speed as the driving-shaft, the brake, of course, being released at this time. When clutching and unclutching the parts, as above described, the frame is in each instance released, so it can turn and the brake gradually applied in order to relieve the sudden jar incident to starting, as is well understood. To reverse the direction of rotation of the sprocket-wheel 24, the ring 28 is moved in the opposite direction until the cusp or projection $28^3$ (see Fig. 6) is made to engage the corresponding sliding head 27 and force the gear $14^2$ into engagement with the gear $18^2$, said gear meshing with the loose gear 3, which will thereby impart a motion in a reverse direction to the mechanism, the other gear connections of course being out of engagement. As already stated, the band or brake 7 is released prior to the clutch engaging or disengaging operation, after which the brake is again gradually applied.

What I claim as my invention, and desire to secure by Letters Patent, is—

1. In a variable-speed transmission mechanism, in combination, a driving-shaft, a driving-gear rigidly secured thereto and a gear loosely sleeved thereon, a frame rotatably mounted upon said driving-shaft, independent gear connections of different velocity ratios journaled in said frame and interposed between the said driving-gear and the loosely-sleeved gears, a clutching device for releasing and engaging the constituent members of each of said gear connections from and with each other, means fixed to said loosely-sleeved gears for delivering power from said mechanism, and means for restraining rotative movement of said frame, substantially as and for the purpose set forth.

2. In a variable-speed transmission mechanism, in combination, a driving-shaft, a driving-gear rigidly secured thereto and a plurality of gears having a fixed relation with respect to each other loosely sleeved thereon, a frame rotatably mounted upon said driving-shaft, independent gear connections of different velocity ratios journaled in said frame and interposed between the said driving-gear and the loosely-sleeved gears, a clutching device for releasing and engaging the constituent members of each of said gear connections from and with each other, means fixed to said loosely-sleeved gears for delivering power from said mechanism, and means for restraining rotative movement of said frame, substantially as and for the purpose set forth.

3. In a variable-speed transmission mechanism, in combination, a driving-shaft, a driving-gear rigidly secured thereto and a plurality of gears having a fixed relation with respect to each other loosely sleeved thereon, a frame rotatably mounted upon said driving-shaft, independent gear connections of different velocity ratios journaled in said frame and interposed between the said driving-gear and the loosely-sleeved gears, a reversing-gear connection extending between the driving member of one of said independent gear connections and one of the loosely-sleeved gears on the driving-shaft, a clutching device for releasing and engaging the constituent members of each of said gear connections from and with each other, means fixed to said loosely-sleeved gears for delivering power from said mechanism, and means for restraining rotative movement of said frame, substantially as set forth.

4. In a variable-speed transmission mechanism, in combination, a driving-shaft, a driving-gear rigidly secured thereto and a plurality of gears loosely sleeved thereon, a frame rotatably mounted upon said driving-shaft, independent gear connections of different velocity ratios journaled in said frame and interposed between the said driving-gear and the loosely-sleeved gears, a reversing-gear connection extending between the driving member of that one of the said independent gear connections having the least velocity ratio and one of the loosely-sleeved gears on the driving-shaft, a clutching device for releasing and engaging the constituent members of each of said gear connections from and with each other, means fixed to said loosely-sleeved gears for delivering power from said mechanism and means for restraining rotative movement of said frame, substantially as set forth.

5. In a variable-speed transmission mechanism, in combination, a driving-shaft, a driving-gear rigidly secured thereto and a plurality of gears having a fixed relation with respect to each other loosely sleeved thereon, a frame rotatably mounted upon said driving-shaft, independent gear connections of different velocity ratios journaled in said frame and interposed between the said driving-gear and the loosely-sleeved gears, a reversing-gear connection extending between the driving member of one of the said independent gear connections and one of the loosely-sleeved gears on the driving-shaft, a clutching device arranged to both simultaneously and successively effect the release and engagement of the constituent members of each of said gear connections from and with each other, a sprocket-wheel fixed to said loosely-sleeved gears for delivering power from said mechanism, and means for restraining rotative movement of said frame, substantially as set forth.

6. In a variable-speed transmission mechanism, in combination, a driving-shaft, a driving-gear rigidly secured thereto and a plurality of gears loosely sleeved thereon, a frame rotatably mounted upon said driving-shaft, a plurality of fixed shafts placed therein, independent gear connections of different velocity ratios journaled on said fixed shafts in said frame and interposed between the said driving-gear and the loosely-sleeved gears, one gear in each independent gear connection being movable longitudinally of the shaft on which it journals, a reversing-gear connection extending between the driving member of one of said independent gear connections and one of the loosely-sleeved gears on the driving-shaft one of said gears being also longitudinally movable on its shaft, a clutching device for releasing and engaging the constituent member of each of said gear connections from and with each other, a sprocket-wheel fixed to said loosely-sleeved gears for delivering power from said mechanism, and means for restraining rotative movement of said frame, substantially as set forth.

7. In a variable-speed transmission mechanism, in combination, a driving-shaft, a driving-gear rigidly secured thereto and a plurality of gears loosely sleeved thereon, a frame rotatably mounted upon said driving-shaft, independent gear connections of different velocity ratios journaled in said frame and interposed between the said driving-gear and the loosely-sleeved gears, a reversing-gear connection extending between the driving member of one of said independent gear connections and one of the loosely-sleeved gears on the driving-shaft, a single clutching device for releasing and engaging the constituent members of each of said gear connections from and with each other, said clutching device consisting of a ring provided with cam-surfaces, actuating mechanism therefor and suitable means for operatively connecting said cam-ring with the gear connection, a sprocket-wheel fixed to said loosely-sleeved gears for delivering power from said mechanism and means for restraining rotative movement of said frame, substantially as set forth.

8. In a variable-speed transmission mechanism, in combination, a driving-shaft, a driving-gear rigidly secured thereto and a plurality of gears loosely sleeved thereon, a frame rotatably mounted upon said driving-shaft, planetary gears journaled in said frame and constituting a plurality of gear connections between the said driving-gear and the several loosely-sleeved gears, clutching devices arranged to release and engage the planetary gears from and with each other, and a single brake for restraining rotary movement of the said frame and the said planetary gears journaled therein about the driving-shaft substantially as and for the purpose specified.

HENRY K. COWEN.

Witnesses:
ALBIN R. PETERSON,
J. P. WARNES.